United States Patent
Paulen et al.

(10) Patent No.: US 6,218,477 B1
(45) Date of Patent: *Apr. 17, 2001

(54) AQUEOUS BINDERS BASED ON POLYBUTADIENE

(75) Inventors: Wilfried Paulen; Rainer Elm, both of Marl; Werner Freitag, Dorsten; Martina Ortelt, Marl; Wolfgang Sasse, Haltern; Karin Sokolowski, Gelsenkirchen, all of (DE)

(73) Assignee: Huels Aktiengesellschaft, Marl (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/041,021

(22) Filed: Mar. 12, 1998

(30) Foreign Application Priority Data

Mar. 13, 1997 (DE) .............................................. 197 10 373

(51) Int. Cl.$^7$ ........................................................ C08F 8/32
(52) U.S. Cl. .................................... 525/327.6; 525/329.5; 525/329.6; 525/379
(58) Field of Search .............................. 525/327.6, 329.5, 525/329.6

(56) References Cited

FOREIGN PATENT DOCUMENTS 36 32 277   4/1988   (DE) .
41 12 535   10/1992  (DE) .

*Primary Examiner*—Bernard Lipman
(74) *Attorney, Agent, or Firm*—Oblon, Spivak, McClelland, Maier & Neustadt, P.C.

(57) ABSTRACT

A water-soluble or water-dispersible binder based on polybutadienes which is modified with at least 5% by weight of maleic anhydride and wherein at least 30% of the anhydride groups are present as imide groups from reaction with an amino carboxylic acid.

10 Claims, No Drawings

AQUEOUS BINDERS BASED ON POLYBUTADIENE

BACKGROUND OF THE INVENTION

1. Field of the Invention

The present invention relates to aqueous binders based on polybutadiene which are suitable for use as air-drying coating materials and which can be processed entirely without organic solvents.

2. Description of the Background

Aqueous coating systems have become increasingly important as they enable reductions in solvent emissions.

As a consequence of the continual increase in environmental awareness, tighter statutory regulations and the introduction of so-called eco audits, the necessity of maintaining clean air continues. As a result, producers and users of coating systems must develop and employ processes and products devoid of harmful, environmentally polluting emissions.

Aqueous binders based on polybutadiene are obtainable by modification with maleic anhydride (MAA), wherein the resulting anhydride functions are reacted further to afford free carboxyl groups. Partial or complete neutralization of these carboxyl groups provides water-soluble or water-dispersible binders.

The known modification of polybutadienes with MAA is described, for example, in DE-B 12 92 299 and in DE-B 12 19 684. Films of such MAA adducts show improved substrate adhesion compared with those having polybutadienes which have not been modified.

Polybutadiene/maleic anhydride adducts can be partially esterified or amidated; see DE 10 26 900, 25 07 809, 26 33 362 or 27 33 274. The monoesters or monoamides formed, respectively, in the reaction with alcohol or with secondary amines have free carboxyl groups. Some or all of these groups can be neutralized, thereby giving water-soluble or water-dispersible binders, respectively.

It is also possible to obtain water-soluble or water-dispersible binders by imidating the anhydride groups.

According to DE-A 25 53 593, water-dilutable polymer oil imides are obtained by reacting polybutadiene/maleic anhydride adducts with ammonia or urea.

In DE-A 27 54 733 or 26 16 591 maleic anhydride-containing polybutadienes are reacted with diamines which include one primary or one tertiary amine function. While the primary amine function undergoes an imidation reaction with the anhydride groups, the tertiary amine function can be neutralized with acids so that the polybutadienes thus functionalized likewise become soluble in water.

Polybutadiene oils having a high cis double bond content are advantageous as a base for paint binders because of the good drying properties in air and the outstanding chemical resistance of the paint films. An improvement in the drying properties, especially the initial physical drying of polybutadiene-based binders, can be achieved, according to DE-A 27 33 274, by a graft reaction with unsaturated monomers.

Grafted polybutadiene/maleic anhydride adducts of this kind can be made soluble or dispersible in water in the same way as described above; see DE 26 33 262, 27 33 274, 27 54 733 and EP 0 170 184.

Graft reactions of unsaturated monomers with polybutadiene/maleic anhydride adducts are carried out in solution or, preferably, as a bulk polymerization with free-radical initiators. Such free-radically controlled graft polymerizations generally proceed in an irregular and incomplete way, with the consequence that significant residual amounts of monomers and oligomers remain in the binder.

In aqueous dispersions or coating materials prepared from grafted binders, these monomer and oligomer residues lead to severe odor nuisance. It is readily evident that, following the application of such dispersions or coating materials, the monomers escape from the coating film together with the water, in the course of drying, and thus produce to an environmentally polluting emission.

Moreover, unsaturated monomers customarily used for the graft reaction, for example styrene or acrylates and/or methacrylates are hazardous substances with known toxicity. Thus, a need exists for an organic solvent-free, environmentally friendly, polybutadiene-based binder which is free of odor-causing residual monomers.

SUMMARY OF THE INVENTION

Accordingly, it is an object of the present invention to provide a completely solvent-free, environment-friendly polybutadiene-based binder without the disadvantages of the graft reaction, for example, the severe odor nuisance caused by residual monomers.

It is also an object of the present invention to provide a binder which exhibits rapid initial physical drying of the grafted binder.

It is, moreover, an object of the present invention to provide a binder having good coatings properties, for example outstanding corrosion protection integrity, good substrate adhesion, and sufficient stability on storage of the aqueous dispersions and pigmented systems produced therefrom.

The above objects and others are provided by a water-soluble or water-dispersible binder based on polybutadienes which is modified with at least 5% by weight of maleic anhydride or another ethylenically unsaturated dicarboxylic acid or an anhydride or a monoester thereof, and wherein at least 30% of the anhydride groups are present as imide groups from reaction with an amino carboxylic acid.

DETAILED DESCRIPTION OF THE PREFERRED EMBODIMENTS

The present invention provides water-soluble or water-dispersible binders based on polybutadienes which have been modified with at least about 5% by weight of maleic anhydride and where at least about 30% of the anhydride groups have been reacted with amino carboxylic acids to form imide groups. In order to achieve good coating properties, in addition to rapid initial physical drying, from at least about 30 to 100%, preferably from about 45 to 85%, of the anhydride structures have been reacted with amino carboxylic acids, preferably with aromatic amino carboxylic acids, to form imide groups.

The remaining anhydride groups which have not been reacted with amino carboxylic acids can be reacted further, in whole or in part, with secondary amines and/or alcohols and/or aniline.

Aqueous dispersions or coating materials containing polybutadiene-based binders modified in accordance with the present invention no longer possess the disadvantages of odor nuisance as a result of containing toxic residual monomers, since graft reaction with unsaturated monomers is avoided.

In addition to rapid initial drying, further enhanced performance properties are also provided, such as compatibility of the binders with zinc-containing pigments, as well as good substrate adhesion and excellent corrosion resistance of the anti-corrosion paints produced from these binders. The storage stability both of the aqueous dispersions and of the pigmented systems prepared therefrom is, moreover, excellent.

Although DE-A 36 32 277 describes the reaction of maleic anhydride-modified polybutadienes with amino carboxylic acids; the binders described therein are, without exception, grafted with unsaturated monomers and therefore present the disadvantage of odor nuisance.

Further, DE-A 36 32 277 describes the reaction of grafted polybutadiene/maleic anhydride adducts with amino acids as improving the compatibility of the thus-modified binders with zinc-containing anti-corrosion pigments, so that the use of solvent can be avoided in the course of processing. Improved corrosion protection levels are also described. However, there is no mention of any improvement, or the feasibility of such, in initial physical drying.

One preferred embodiment of the invention entails water-soluble or water-dispersible binders based on polybutadiene/maleic anhydride adducts, containing:

A) from about 35 to 95% by weight of polybutadiene,

B) from about 0 to 40% by weight of hydrocarbon resins, and

C) from about 5 to 25% by weight of maleic anhydride, wherein components A), B) and C) are chosen so that their sum is 100% by weight and the incorporated anhydride groups have been further reacted:

| | |
|---|---|
| to the extent of from about 30 to 100% | with aminocarboxylic acids |
| to the extent of from about 0 to 70% | with secondary amines |
| to the extent of from about 0 to 70% | with alcohols |
| to the extent of from about 0 to 70% | with aniline |

Preferred polybutadienes have molecular weights, determined as the numerical average, of from about 500 to 10,000 and iodine numbers, in accordance with Wijs of from about 300 to 500 mg of iodine/100 g of substance.

The preferred polybutadienes, moreover, preferably have molecular structures comprising from about 70 to 90% cis double bonds, from about 10 to 30% trans double bonds and from about 0 to 3% vinyl double bonds.

Mixtures of different polybutadienes and polybutadiene copolymers can also be employed.

Examples of hydrocarbon resins B. are described in: Karsten Lackrohstofftabellen, Curt R. Vincentz Verlag, Hannover 1992, 9th ed., p. 401 ff.; Encycl. Polym. Sci. Engn. 7, 758–782 Kirk-Othmer (3rd ed.) 12, 852–869, Ullmann (4th ed.) 12, 539–549.

These hydrocarbon resins are polymers of unsaturated compounds which are generally obtained from petroleum, coal tar or turpentine. Preferred hydrocarbon resins B) are unsaturated compounds which are able to react with maleic anhydride having a C=C linkage with retention of the anhydride structure.

As component C), it is preferred for reasons of economy and reactivity to employ maleic anhydride. However, it is also possible to use other ethylenically unsaturated dicarboxyl compounds, such as ethylenically unsaturated dicarboxylic acids, their anhydrides or monoesters.

Examples of said compounds are maleic acid, fumaric acid, itaconic acid, 3,6-tetrahydrophthalic acid, itaconic anhydride, 1,2-dimethylmaleic anhydride, monomethyl or monoethyl maleate, for example.

The preparation of the polybutadiene/maleic anhydride adducts from A) polybutadienes, if used B) hydrocarbon resins and C) maleic anhydride takes place by known methods.

After adding a polymerization inhibitor, the components are heated generally for from 2 to 5 hours at temperatures from about 180 to 200° C. under an inert gas atmosphere (nitrogen or argon, for example). The amount of the polymerization inhibitor generally lies within an order of magnitude of from 0.01 to 0.5% by weight based on the sum of A)+C) or A)+B)+C).

Examples of preferred inhibitors are hydroquinone, 2,5-di-tertbutylhydroquinone, hydroquinone monoethyl ether, copper naphthenate, copper acetylacetonate, phenylenediamine, and products based on alkyl and aralkyl-substituted phenols, for example.

The imidation reaction of amino carboxylic acids and, if used, aniline with the incorporated anhydride structures can take place by customary methods. It can be carried out in solution, but preferably in bulk, in the presence or absence of a polymerization inhibitor. The reactions take place at temperatures from 130 to 190° C. and in reaction times of from 1 to 5 hours. The removal of the water of reaction formed can be accelerated by passing a stream of inert gas through the reaction mixture, or under reduced pressure.

For improving the initial physical drying, aromatic amino carboxylic acids are preferably suitable, examples being 2-aminobenzoic, 2-amino-4-chlorobenzoic, 2-amino-5-chlorobenzoic, 2-amino-6-chlorobenzoic, 2-amino-4-nitrobenzoic, 2-amino-5-nitrobenzoic, 3-aminobenzoic, 3-amino-5-nitrobenzoic, 3-amino-4-methylbenzoic, 4-aminobenzoic, 4-amino-2-nitrobenzoic acids, for example.

The use of aliphatic or cycloaliphatic amino carboxylic acids, for example, aminoacetic, 2-aminopropanoic, 3-aminopropanoic, aminobutanoic, aminohexanoic, aminooctanoic, aminoundecanoic, aminododecanoic, 1-aminocyclopentanoic or 1-aminocyclohexanoic acids, may lead to special and desired effects.

It is also possible to employ mixtures of different amino carboxylic acids.

The partial esterification with alcohols or imidation with secondary amines is effected by known methods.

The reaction can be carried out in solution, but preferably without a solvent, in the presence or absence of a polymerization inhibitor and/or of an esterification catalyst, at from 80 to 170° C. Examples of preferred alcohols are methanol, ethanol, isopropanol, tert-butanol, ethylglycol, butylglycol, cyclohexanol, phenol, other modified phenols, 2-hydroxyethyl acrylate, 2-hydroxypropyl acrylate or 2-hydroxyethyl methacrylate, for example.

Mixtures of alcohols can also be employed.

Examples of preferred secondary amines are dimethylamine, diethylamine, di-n-butylamine and dicyclohexylamine.

Mixtures of amines can also be employed.

For neutralizing the binders of the present invention it is possible to use inorganic bases, such as sodium or potassium hydroxide solution, for example. It is preferred, however, to employ ammonia and/or amines, examples being methylamine, ethylamine, dimethylamine, diethylamine, trimethylamine, triethylamine, monoethanolamine, diethanolamine, triethanolamine, dimethylaminoethanol, diethylaminoethanol, 2-dimethylamino-2-methyl-1-propanol, 2-amino-2-methyl-1-propanol or morpholine.

Mixtures of amines can also be employed for the neutralization.

Neutralization of the acid functions of the present binders makes it possible to obtain aqueous dispersions having solids contents of up to about 50%. Degrees of neutralization of from about 0.7 to 0.95 are preferably established.

In the preparation of the aqueous dispersions a preferred procedure is to stir the resin melt into a hot mixture of deionized water and neutralizing agent which is at from about 50 to 90° C.

The resulting aqueous dispersions have pH values of from about 7.0 to 10.0.

The dispersions can be used directly to produce clear films.

In general, however, they additionally contain pigments and further additives.

Examples of typical inorganic pigments are iron oxides, titanium dioxide, zinc oxide, strontium chromate and zinc phosphate. However, organic color pigments can be employed alternatively or additionally.

It is also possible to use customary additives such as, for example, driers, antioxidants, leveling assistants, stabilizers, antifoams, wetting agents, thixotropical auxiliaries and possibly fillers as well.

Preferred driers are the octoates, maleates, naphthenates, oleates and resinates of the metals cobalt, manganese, chromium, zirconium, iron, zinc, aluminum and calcium. Application of the coating materials, prepared from the present binders can take place by techniques customary in the art, such as spreading, spraying, dipping, pouring, rolling, etc.

Having described the present invention, reference will now be made to certain Examples which are provided solely for purposes of illustration and are not intended to be limitative.

EXAMPLES

1. Preparing the MAA-modified Starting Resin for Comparison Example 1 and for Examples 1, 2 and 4

All reaction steps were carried out under inert gas conditions. A 4 l glass reactor was rendered inert with nitrogen and was equipped with jacket, stirrer, heated dropping funnel and nitrogen inlet tube and was charged with 2100 g of Polyöl [polyoil] 110[1] and 525 g of an unsaturated hydrocarbon resin[2], and 0.02% (based on resin mixture+ maleic anhydride) of a polymerization inhibitor of the alkylphenol type was added.

[1]Polyöl 100: Supplier: Hüls A G, Paul-Baumann Str. 1, 45772 Marl, Germany
[2]ESCOREZ 8100: Supplier: Deutsche Exxon Chemical GmbH, Dompropzt-Ketzer Str. 1-9, 5000 Cologne 1, Germany.

With continual nitrogen blanketing, the mixture was heated to 195° C. with stirring and 462 g of melted maleic anhydride (80° C.) was added dropwise over the course of one hour. The internal temperature was raised to 200° C. and stirring was continued for 4 hours.

The resulting product is viscous at room temperature and has an acid number of 153 mg of KOH/g of substance.

II. Preparing a grafted MAA modified polybutadiene for Comparison Example 2

All reaction steps were carried out under an inert gas atmosphere. 1751 g of Polyöl[1] and 338 g of maleic anhydride were weighed into a 4 l glass flask equipped with stirrer, nitrogen inlet tube and a cooling and heating device, and 0.85 g each of copper naphthenate and acetylacetone was added. The mixture was heated under a nitrogen atmosphere to 190–200° C. and was held at this temperature for 6 hours. The resulting product is viscous and has an acid number of 159 mg of KOH/g of substance. It was cooled to 140° C., 531 g of styrene, 6.2 g of n-dodecyl mercaptan and 2.2 g of di-tert-butyl peroxide were added, and stirring was continued at 140° C. until the viscosity corresponds to a flow time [DIN 53 211] of 51 sec. from the DIN-4 cup. The measurement was made in 50% strength solution in styrene.

III. Preparing the MAA-modified starting resin for Examples 3 and 5

All reaction steps were carried out under an inert gas atmosphere. A 2 l glass reactor which was rendered inert with nitrogen and was equipped with jacket, stirrer, heated dropping funnel and nitrogen inlet tube and was charged with 1150 g of Polyöl [polyoil] 110[1], and 0.03% (based on Polybi 110[1] maleic anhydride) of a polymerization inhibitor of the alkylphenol type was added. With nitrogen blanketing, the reactor contents were heated to 195° C. with stirring and 287.5 g of melted maleic anhydride (80° C.) was added dropwise over the course of one hour. The reaction mixture was stirred at 200° C. for 4 hours more. The product obtained after cooling to room temperature is viscous and has an acid number of 205 mg of KOH/g of substance.

Preparation of the Comparison Examples

Comparison Example 1 a) Resin preparation

All operations are carried out under-an inert-gas atmosphere. In a 1 l glass reactor with jacket, stirrer, dropping funnel, reflux condenser and nitrogen inlet tube, 38 g of diethylamine were added over the course of one hour at 110° C. to 400 g of product I. The mixture was subsequently heated to 130° C. and was stirred at this temperature for 3 hours.

The acid number of the resin is 81 mg of KOH/g of substance.

b) Dispersion:

To prepare the aqueous resin dispersion, the resin was heated to 160° C. in the 1 l glass reactor and was transferred via a heated connection tube into a 2 l glass reactor. The 2 l glass reactor was fitted with a high-speed stirrer and contains a deionized water/neutralizing agent mixture, heated to 70° C. and consisting of:

| | |
|---|---|
| 456 g of | deionized water, |
| 32.3 g of | 25% strength aqueous ammonia solution, and |
| 18.5 g of | 80% strength aqueous 2-dimethylamino-2-methyl-l-propanol solution |

Comparison Example 2 a) Resin preparation

All operations were carried out under an inert gas atmosphere. In a 1 l glass reactor with jacket, stirrer, dropping funnel, reflux condenser and nitrogen inlet tube, 18.8 g of diethylamine were add ed over the course of 2 hours at 100° C. to 400 g of product II. The mixture is stirred at this temperature for 2 hours.

b) Dispersion:

To prepare an aqueous resin dispersion, the resin was transferred from reactor-and via a heated connection tube into a 2 l glass reactor. The 2 l glass reactor is fitted with a high-speed stirrer and contains a deionized water/neutralizing agent mixture, heated to 50° C. and consisting of:

| | |
|---|---|
| 921 g of | deionized water, |
| 27.4 g of | 25% strength aqueous ammonia solution, |
| 4.6 g of | triethylamine, and |
| 6.2 g of | butanone oxime. |

Preparation of the Examples

All reaction steps were carried out under an inert gas atmosphere. The binders were prepared in a 1 l glass reactor fitted with jacket, stirrer, nitrogen inlet tube, reflux condenser and water separator. The water of reaction which formed in the course of the imidation reaction was removed from the binder with the aid of a stream of nitrogen.

For the preparation of the dispersions the melt prepared in the 1 l glass reactor was transferred via a heated connecting tube into a 2 l glass reactor which was fitted with a high-speed stirrer and contains a deionized water/neutralizing agent mixture which has been heated to 70° C.

Example 1 a) Binder preparation:

400 g of product I were heated to 160° C. in the 1 l glass reactor. At this temperature, 71.1 g of 3-aminobenzoic acid were introduced and the mixture was heated carefully (severe foaming possible) to 180° C. After 3 hours, the temperature was raised to 185° C. and maintained for one hour. The acid number of the modified binder is 76 mg of KOH/g of substance.

b) Conditions for the dispersing process in the 2 l glass reactor

Binder temperature: 180° C.

The initially charged mixture of deionized water/neutralizing agent consists of

| | |
|---|---|
| 546.8 g of | deionized water, |
| 32.6 g of | 25% strength of aqueous ammonia solution, |
| 18.7 g of | 80% strength aqueous 2-dimethylamino-2-methyl-l-propanol, and solution |

Example 2 a) Binder preparation:

400 g of product I are heated to 160° C. in the 1 l glass reactor. At this temperature, 71.1 g of 4-aminobenzoic acid were introduced and the mixture was heated carefully (severe foaming possible) to 180° C. After 3 hours, the temperature was raised to 185° C. and maintained for one hour. The acid number of the resulting binder is 75 mg of KOH/g of substance.

b) Conditions for the dispersing process in the 2 l glass reactor:

Binder temperature: 180° C.

The initially charged mixture of deionized water/neutralizing agent consists of:

| | |
|---|---|
| 547 g of | deionized water, |
| 32.2 g of | 25% strength of aqueous ammonia solution, and |
| 18.5 g of | 80% strength aqueous 2-dimethylamino-2-methyl-l-propanol solution |

Example 3 a) Binder preparation:

400 g of product III were reacted as in Example 2 with 95.2 of 4-aminobenzoic acid.

b) Conditions for the dispersing process in the 2 l glass reactor:

Binder temperature: 195° C.

The initially charged mixture of deionized water/neutralizing agent consists of:

| | |
|---|---|
| 600 g of | deionized water, |
| 42.8 g of | 25% strength of aqueous ammonia solution, and |
| 24.6 g of | 80% strength aqueous 2-dimethylamino-2-methyl-l-propanol solution |

Example 4 a) Binder preparation:

400 g of product I were reacted with 20 g of diethylamine under the same reaction conditions as in Comparison Example 1. The acid number of the reacted reaction product is 96 mg of KOH/g of substance.

This reaction product was reacted further as in Example 2 with 33.7 g of 4-aminobenzoic acid.

The acid number of the resulting binder is 56 mg of KOH/g of substance.

b) Conditions for the dispersing process in the 2 l glass reactor

Binder temperature: 160° C.

The initially charged mixture of deionized water/neutralizing agent consists of:

| | |
|---|---|
| 457 g of | deionized water, |
| 23.1 g of | 25% strength of aqueous ammonia solution, and |
| 13.3 g of | 80% strength aqueous 2-dimethyl-2-methyl-l-propanol solution. |

Example 5 a) Binder preparation:

400 g of product III were reacted with 26.7 g of diethylamine under the same reaction conditions as in Comparison Example 1. The acid number of the reaction product is 122 mg of KOH/g of substance. This product was reacted further as in Example 2 with 45.1 g of 4-amino-benzoic acid. The acid number after the reaction is 72 mg of KOH/g of substance.

b) Conditions for the dispersing process in the 2 l glass reactor

Binder temperature: 180° C.

The initially charged mixture of deionized water/neutralizing agent consists of:

| | |
|---|---|
| 499 g of | deionized water, |
| 30.9 g of | 25% strength of aqueous ammonia solution, and |
| 17.7 g of | 80% strength aqueous 2-dimethyl-2-methyl-l-propanol solution. |

The aqueous resin dispersions of both the Comparison Examples and the Examples are stable on storage at 23° C. for at least 6 months.

While the styrene-grafted Comparison Example 2 has a severe styrene odor, no styrene odor can be noted for the aqueous dispersions of Examples 1 to 5.

The rapid physical drying properties was demonstrated on clearcoat films of the novel resin dispersions by means of dust drying and through-drying.

For this purpose, the aqueous resin dispersions of the Comparison Examples and of the Examples, without added siccatives, are applied to cleaned, degreased glass plates using a film applicator (200 μm wet film thickness) and are tested under standard climatic conditions.

The dry film thicknesses were-measured after 7 days and were within an order of magnitude of from 35 to 40 μm. The results are summarized in Table 1.

TABLE 1

|  | Dust Drying | Through-drying |
| --- | --- | --- |
| Comparison Example 1 | 180 min. | >12 h |
| Comparison Example 2 | 90 min. | 240 min. |
| Example 1 | 75 min. | 150 min. |
| Example 2 | 60 min. | 75 min. |
| Example 3 | 60 min. | 75 min. |
| Example 4 | 75 min. | 225 min. |
| Example 5 | 75 min. | 180 min. |

Other coatings properties, such as corrosion protection integrity and substrate adhesion, for example, were tested on primer coats and in combination with topcoat systems.

Preparation of Primers

The primers were prepared from Example 4 according to the invention and from grafted Comparison Example 2 as follows:

The raw materials were combined slowly in a dissolver in the sequence stated in the recipe. Dispersion was then carried out on a bead mill for 1 hour using glass beads (diameter about 1 mm) in the ratio of 1:1 (coating material: glass beads). Before being applied by spray gun, the coating material was passed through a 240 μm rapid sieve and then applied in a wet film thickness of about 250 μm.

Pigmentation Recipe

| Binder, calculated as 40% SC | 63.08% by mass |
| --- | --- |
| Bayferrox 130 | 12.61% by mass |
| Sicor NOP | 8.84% by mass |
| Talc OOS | 13.17% by mass |
| Sicorin RZ | 2.00% by mass |
| Metolat FC 530 | 0.30% by mass |
| SER-AD 1010*) | 1.00% by mass |
| Co Web 8%**) | 0.10% by mass |

*)based on total batch, as 10% strength solution
**)calculated as metal, based on binder Suppliers 1) Huüls A G, 45764 Marl, Germany
2) Bayer A G, 51368 Leverkusen, Germany
3) BASF A G, 67056 Ludwigshafen, Germany
4) Hanf u. Nelles, 40554 Dusseldorf, Germany
5) Münzing GmbH, 74017 Heilbronn, Germany The primers prepared from the grafted Comparison Example 2 and the Example 4 according to the present invention were applied to degreased steel panels and tested initially without a topcoat. The results are summarized in Table II.

TABLE II

|  | Comparison | Example |
| --- | --- | --- |
| Storage stabilities of the primers | >4 weeks | >4 weeks no |
| Odor or the primers | styrene odor | styrene odor |
| König pendulum hardness on glass [DIN 53 157] |  |  |
| after 24 h | 42 s | 62 s |
| after 1 d | 60 s | 86 s |

TABLE II-continued

|  | Comparison | Example |
| --- | --- | --- |
| after 2 d | 76 s | 95 s |
| after 5 d | 94 s | 117 s |
| after 8 d | 95 s | 120 s |
| after 16 d | 111 s | 126 s |
| Dry film thickness after | approx. 25 μm | approx. 25 μm |
| Crosshatch adhesion | Gt o | Gt 0 |
| [DIN EN ISO 02490] |  |  |
| Corrosion protection data |  |  |
| a) Salt spray test [DIN 53 167] | 250 h | 350 h |
| b) Adhesion and adhesive tape tearoff[1] at the end of the salt spray test | C | A |

Evaluation criteria
O = nothing found
A = up to 114 of the coated area shows delamination
B = up to half of the coated area shows delamination
C = more than half of the coated area shows delamination For further investigation of the corrosion protection integrity, the primers of Comparison Example 2 and of Example 4 were oversprayed with two different topcoats and after storage for 10 days under standard climatic conditions [DIN 50 014] were subjected to the salt spray test in accordance with DIN 53 167.

Topcoat systems employed were
Topcoat 1—Exterior color based on Lipaton AE 4620
Guideline recipe 91–142
Supplier: PolymerLatex GmbH, Marl, Germany
Topcoat 2—White alkyd paint
Manufacturer: Perfekt GmbH, Hagen, Germany
Supplier: Schwarz, Recklinghausen, Germany The corrosion protection results are summarized in Table III.

TABLE III

|  | Comparison | Example |
| --- | --- | --- |
| Topcoat 1 |  |  |
| a) Salt spray test [DIN 53 167] | 250 | 500 |
| b) Adhesion and adhesive tape tearoff[1] at the end of the salt spray test |  |  |
| Topcoat <-> primer |  |  |
| Primer <-> metal | A | A |
|  | C | A |
| Topcoat 2 |  |  |
| a) Salt spray test [DIN 53 167] | 1000 | 1000 |
| b) Adhesion and adhesive tape tearoff[1] at the end of the salt spray test |  |  |
| Topcoat <-> primer |  |  |
| Primer <-> metal | B | O |
|  | A | O |

[1]For key to evaluation criteria see Table II

Having further described the present invention it will now be apparent to one of ordinary skill in the art that many changes may be made to the above-described embodiments without departing from the spirit and the scope of the present invention.

What is claimed as new and desired to be secured by Letters Patent of the United States is:

1. A water-soluble or water-dispersible binder based on polybutadienes which are modified in the absence of ethylenically unsaturated graft monomers and with at least about 5% by weight of an ethylenically unsaturated dicarboxylic acid or an anhydride or monoester thereof, and wherein at least 30% of the anhydride groups are present as imide groups from reaction with an amino carboxylic acid.

2. The binder as claimed in claim 1, wherein the amino carboxylic acids present are aromatic amino carboxylic acids.

3. The binder as claimed in claim 1, wherein liquid polybutadienes having a cis double bond content of at least 50% are employed.

4. The binder as claimed in claim 3, comprising from about 70 to 90% cis double bonds, from about 10 to 30% trans double bonds and from about 0 to 37% vinyl double bonds.

5. A method of preparing a coating or adhesive or both, which comprises incorporating the binder of claim 1 in said coating or adhesive or both.

6. A method of preparing an aqueous, air-drying anti-corrosion binder, which comprises incorporating the binder of claim 1 into an aqueous dispersion.

7. A water-soluble or water-dispersible binder, which consists essentially of:
polybutadienes which are modified in the absence of ethylenically unsaturated graft monomers and with at least about 5% by weight of an ethylenically unsaturated dicarboxylic acid or an anhydride or monoester thereof, and wherein at least 30% of the anhydride groups are present as imide groups from reaction with an amino carboxylic acid.

8. A water-soluble or water-dispersible binder, which consists essentially of:
a mixture of unsaturated hydrocarbon resin and polybutadienes which are modified in the absence of ethylenically unsaturated graft monomers and with at least about 5% by weight of an ethylenically unsaturated dicarboxylic acid or an anhydride or monoester thereof, and wherein at least 30% of the anhydride groups are present as imide groups from reaction with an amino carboxylic acid.

9. A water-soluble or water-dispersible binder, which consists essentially of:
polybutadienes which are modified in the absence of ethylenically unsaturated graft monomers and with at least about 5% by weight of an ethylenically unsaturated dicarboxylic acid or an anhydride or monoester thereof, and wherein from 30% to 100% of the anhydride groups are reacted with an amino carboxylic acid and up to 70% of the anhydride groups are reacted with a secondary amine, an alcohol and/or aniline.

10. A water-soluble or water-dispersible binder, which consists essentially of:
a mixture of unsaturated hydrocarbon resin and polybutadienes which are modified in the absence of ethylenically unsaturated graft monomers and with at least about 5% by weight of an ethylenically unsaturated dicarboxylic acid or an anhydride or monoester thereof, and wherein from 30% to 100% of the anhydride groups are reacted with an amino carboxylic acid and up to 70% of the anhydride groups are reacted with a secondary amine, an alcohol and/or aniline.

* * * * *